Patented Nov. 25, 1952

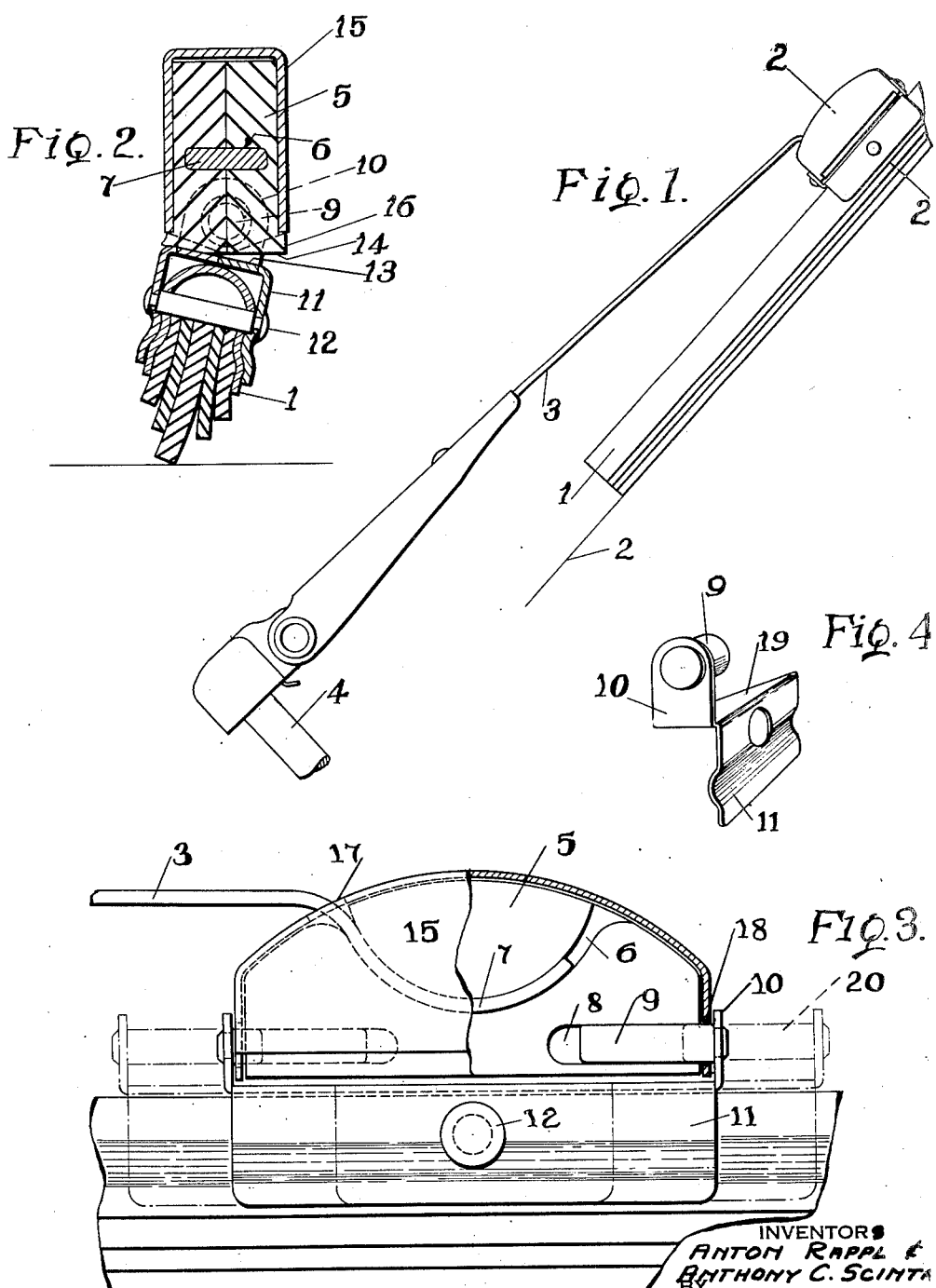

2,618,805

UNITED STATES PATENT OFFICE 2,618,805

WINDSHIELD WIPER ATTACHING CLIP

Anton Rappl, Eggertsville, and Anthony C. Scinta, Buffalo, N. Y., assignors to Trico Products Corporation, Buffalo, N. Y.

Application September 10, 1945, Serial No. 615,436

12 Claims. (Cl. 15—250)

This invention relates to the windshield cleaning art and has particular reference to a wiper blade and the mounting of the same on its actuating arm. Ordinarily, the wiper blade has been hooked into engagement with its actuating arm with a degree of play designed to permit the wiping element assuming a rearwardly inclined dragging position as it is oscillated back and forth over the windshield surface. Sometimes the windshield surface is only partially wet and, therefore, the wiping element tends to cling more tenaciously to the glass surface, which results in an abnormal strain being placed upon the pivotal blade mounting tending to jam the parts and deform the latter so that a true pivotal action will not result.

Again, it is possible that the flop limiting means of the pivotal mounting have been otherwise displaced from their true location with the result that the wiper will fail to assume a proper wiping position and consequently will chatter across the glass with impaired vision. In some embodiments the pivotal mounting is closer to one end of the blade than the other and under abnormal conditions an uneven strain on the opposite ends of the wiping element will act against the blade rocking over to its rearwardly inclined position at the beginning of the succeeding stroke. All of these factors, individually or combined, serve to render the wiper inefficient at times.

The object of the present invention is to provide a wiper in which the initial rocking movement of the blade on each stroke is controlled in a definite and practical manner so that the proper degree of inclination of the dragging wiper will be insured and the greatest efficiency in wiping secured.

Further, the invention has for its object to provide a wiper blade mounting which is quiet in operation, the arrangement incorporating means designed to eliminate the transmission of sound incidental to the initial rocking movement of the blade.

In the drawings:

Fig. 1 is a fragmentary view in elevation depicting the wiper mechanism embodying the present invention;

Fig. 2 is a transverse sectional view about on line 2—2 of Fig. 1;

Fig. 3 is an enlarged fragmentary view of the mounting or connector, with parts removed;

Fig. 4 is a detailed perspective view of one of the pintle members;

Figure 5:
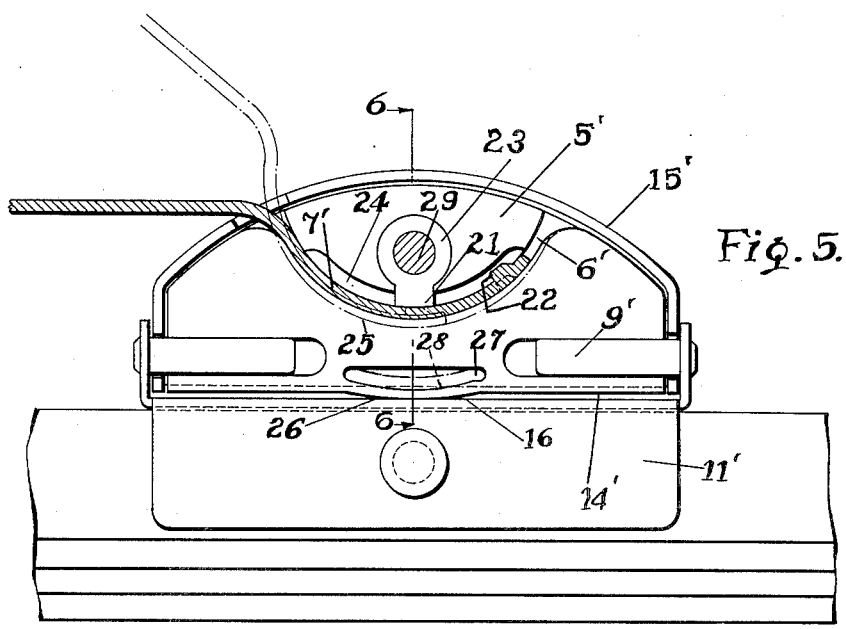
Fig. 5 is a modified construction with one half of the connector being removed.

Referring more particularly to the drawings, the numeral 1 designates a windshield wiper which is adapted to be oscillated across the windshield surface 2 by a carrying arm 3 anchored at its inner end to the actuating shaft 4 of the driving mechanism. The wiper or blade 1 is mounted on the wiping arm 3 by a connector in the form of a rubber block or body 5. This rubber body is formed with a tunnel-like slot or chamber 6 for slidably and frictionally receiving the outer terminal or extremity 7 of the arm 3 and in order to more securely hold the wiper against accidental dislodgment longitudinally from the arm the extremity 7 is curved as shown in Fig. 3. Consequently, the slot or seat 6 is likewise curved so as to compel a swinging movement of the wiper when mounting and demounting the same. The size of the body slot 6 will be sufficiently small to snugly and frictionally engage the arm extremity so as to hold the same against jarring loose.

The rubber body 5, the term rubber including any like soft resilient material, is formed with alined bearings 8 extending lengthwise of the wiper and opening in opposite directions for receiving the pintles 9 which are carried by the upstanding ears 10 on the wiping blade, or on a clip-like bracket 11 fixed thereto by a fastener 12. This provides a mounting for the blade that permits the latter to rock about the axis of the alined pintles 9, an axis which is substantially parallel to the longitudinal axis of the blade itself. Consequently, when the wiper carrying arm 3 is oscillated the wiping blade will rock at the beginning of each stroke about a definitely fixed axis to assume its rearwardly inclined, dragging position with a most uniform result in ridding the windshield surface of excess moisture. The extent of rocking movement is determined by the flat top face 13 of the bracket 11 coming into contact with the under face 14 of the rubber body 5. By reason of this cushioned contact, the wiping blade is not only resiliently backed by its carrying body 5 during each wiping stroke but any sound incidental to the change of position of the wiping blade at the beginning of a stroke is minimized.

A metal housing 15 may be provided to enclose the rubber body 5 for giving support thereto and therewith to form a wiper connector. This housing snugly fits the blade carrying rubber body and fully encloses the same except at the underside which is open and from which the rubber body extends, as shown most clearly at 16 in Figs. 2 and 3. This exposed portion 16 overhangs the surrounding margins of the housing 15 so that there will be no direct metal to metal contact at any time and therefore the underface 14 which is co-extensive with the extending portion will serve as a limiting buffer or stop. The top wall of the housing 15 is provided with an entrance way or opening 17 in registry with one end of the slot 6 for introducing the arm terminal thereinto, while the end walls of the housing are formed with openings 18 in registry with the bearings 8 to freely pass the pintles 9.

While the pintle 9 may be in the form of a single pin passing entirely through the blade mounting body 15 and have its opposite ends engaged in rubber sockets on the blade, is is preferable to reverse the arrangement and to separate the pintle into parts, as shown, since each part may then be riveted to its particular ear 10 prior to assembly. As a further means to facilitate the assembly of the blade mounting, the bracket 11 is formed in two sections with each section carrying an ear 10 and its corresponding pintle part 9. Fig. 4 shows one of these sections, the bracket being severed along a diagonal line as indicated at 19. To assemble the parts, the pintle parts 9 are inserted individually through the opposite ends of the housing and engaged in their respective bearings 8 by sliding movement from the position shown in broken lines 20 in Fig. 3. As the bracket sections, with their pintles, are brought to their operative position, the diagonal margins 19 of the two bracket sections will abut each other and be held in such solid embrace by means of the fastening rivet 12.

From the foregoing it will be observed that the wiper will pivot about the definitely located axis of the pintle parts 9. Any abnormal strain placed upon the wiper will be absorbed, the rubber body yielding on the terminal of the carrying arm to a very limited extent at such times without interfering with the pivoting action.

If desired, the rubber mounting body may be formed in halves which may be individually pre-shaped and then inserted in the metal housing 15 through the lower open end where they will be retained in their operative relationship by the pintle parts 9 as well as by the curved extremity 7 of the carrying arm.

Figure 6:
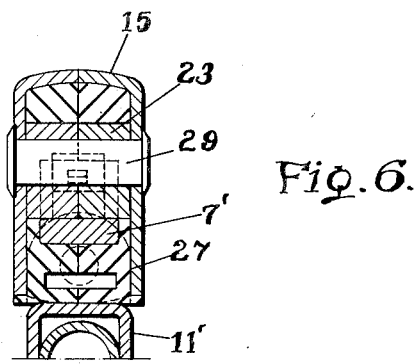
Fig. 6 is a transverse section about on line 6—6 of Fig. 5.

A modified form of blade mounting is illustrated in Figs. 5 and 6 wherein a keeper shoulder or lug 21 projects from the inner wall of the arm receiving tunnel or seat 6' for interlocking with a shoulder 22 on the arm extremity 7'. The keeper lug is preferably rigid and may be formed on a spacer sleeve 23 interposed between the side walls of the housing 15' or it may be formed on any other portion of the blade mounting clip. In this embodiment the housing is divided in two sections along the line of cleavage of the two halves of the rubber body 5', and likewise the spacer sleeve may be divided with one section being formed integral with each housing section. The slot or seat 6' which receives the curved extremity 7' of the arm has its top wall relieved, as at 24, for normally clearing the shoulder 22. The keeper lug 21 extends into this groove 24 to normally lie in the path of the shoulder. When it becomes necessary to remove the wiper from its carrying arm, the free terminal of the latter is pressed downwardly within the rubber body 5' to the broken line position 25 so as to displace the shoulder 22 outwardly beyond the keeper lug, following which the blade may readily be swung free of the arm.

Each division of the rubber mounting body may be formed with a transverse rib or air cushion 26 which extends below the underface 14' and normally exerts a downward pressure on the pintle carrying bracket 11' to urge the wiper to a position perpendicular to the windshield surface. The air cell 27 will enable the rib to readily yield. However, when the blade is at rest the rib 26 will serve to normalize the wiper with respect to the windshield in a manner somewhat similar to the buffer portion 16 shown in the first described embodiment of the invention. The air pocket 27 also facilitates the disengagement of the arm shoulder 22 from the keeper lug since the intermediate body portion may yield downwardly more readily to the dotted line position 28 in Fig. 5. The forward or leading edge of the locking shoulder 22 is preferably inclined to readily pass over the keeper lug 21 when inserting the arm in the seat during which operation the rubber body will yield to permit such passage. The bracket 11' in this form of invention is unitary throughout since the divisions of both the rubber body and the housing may readily be assembled about the fixedly related pintle parts 9' and, after being assembled, be secured in position by a rivet 29 passed through the sustaining spacer 23, as shown in Fig. 6.

The foregoing embodiments provide a cushioned wiper mounting which will absorb the sound vibrations incidental to the flopping of the blade at the start of each wiping stroke. The construction further enables the wiper to assume a uniform position of drag as it starts its sweep across the windshild under the urge of the carrying arm. The cushioned limit stop preferably overhangs the opposite sides of the bracket 11 (11') so as to give ample cushioned support for the blade in its inclined wiping position.

While the foregoing description has been given in detail, it is not intended thereby to restrict the invention beyond the scope of the appended claims since the inventive principles involved are capable of assuming other physical embodiments without departing from the spirit of the present invention.

What is claimed is:

1. A wiper blade having an arm connector, said connector having a yieldable body formed with an arm engaging seat, said blade having spaced pintle parts extending inwardly toward each other into oppositely facing bearings in the body to pivotally mount the blade on the connector.

2. A wiper blade element having an arm connector element formed with an arm seat for detachably receiving an arm, one of said elements having opposed inwardly extending pintle parts engaged in outwardly facing and axially aligned bearings in the other of said elements, and bracket means mounting the pintle parts in axially spaced relation on their supporting element.

3. A wiper blade having an arm connector body formed with an arm receiving seat, said blade having opposed and inwardly extending pintle parts engaged in outwardly facing bearings in the body, and bracket means mounting the pintle parts and having separable sections each supporting a pintle part to enable placement of the latter in its bearing.

4. A wiper blade having a connector pivotally mounted thereon for movement about a longitudinal axis, said connector having a rubber body formed with an arm receiving seat and a housing enclosing the rubber body to give sustaining support thereto, the rubber body projecting from the housing toward the wiper and beyond the pivotal axis to provide a cushioned face engageable by the blade to limit the rocking movement of the latter on its connector.

5. A wiper blade having a pintle part, and an arm attaching clip having a rubber body comprising relatively separable sections formed with complemental bearings assembled about the pintle part, and an inverted cupped housing in which the assembled sections are inserted and secured, the rubber body sections projecting from the housing and reacting against the blade to urge the latter to a position normal to the windshield surface.

6. A wiper blade having aligned pintle parts on its back, and an arm attaching clip formed of soft rubber and comprising relatively separable sections having complemental bearings assembled about the pintle parts, and means securing the sections together, the sections having portions between the pintle parts and the blade seating substantially on the back of the blade and acting to urge the latter to an upright position on the surface being wiped.

7. A wiper blade element having an arm connector element of rubber formed with an arm receiving seat, one of said elements having opposed pintle parts engaged in bearing parts in the other element, bracket means mounting one set of parts and having separable sections each supporting a part to enable placement of the latter in its operative position, and means securing the separable sections fixed to hold the pintle parts in their bearing parts.

8. A wiper blade having a pintle part, and an arm attaching clip having a body of rubber comprising relatively separable sections formed with complemental bearings assembled about the pintle part, and an inverted cupped housing in which the assembled sections are inserted and secured, with the pintle part extending through opposed openings in the walls of the cupped housing and finding support in the bearings of the rubber body sections.

9. A wiper blade, an arm attaching clip carried thereby and having an arm receiving tunnel opening at one end, one wall of the tunnel being constituted of rubber for yielding from the opposing wall to permit the insertion of an arm terminal in the tunnel, and a retaining shoulder on such opposing wall within the tunnel for being engaged with a part on an actuating arm under the resilient urge of the rubber wall.

10. An arm attaching clip for a windshield wiper blade, said clip having a wall with an opening leading into a chamber for receiving a curved terminal of an actuating arm, the clip chamber having an internal transverse shoulder beneath which such curved terminal engages and upon which it may slide to enable the blade adjusting itself to the windshield surface about the curved terminal, such transverse shoulder being engageable on its far side by a shoulder on the arm terminal to secure the clip on the arm when the latter is engaged with the clip, the transverse shoulder being disposed in a lower plane from the entranceway and the wall surface inwardly beyond the transverse shoulder being relieved to receive the arm shoulder to permit of such clip adjustment along the curved terminal.

11. An arm attaching clip for a windshield wiper blade, said clip having a wall with an opening leading into a chamber for receiving a curved terminal of an actuating arm, the clip chamber having an internal transverse shoulder beneath which such curved terminal engages and upon which it may slide to enable the blade adjusting itself to the windshield surface about the curved terminal, such transverse shoulder being engageable on its far side by a shoulder on the arm terminal to secure the clip on the arm when the latter is engaged with the clip, the transverse shoulder being disposed in a lower plane from the chamber opening and the chamber inwardly beyond the transverse shoulder being provided with a recess to receive the arm shoulder to permit of such clip adjustment along the curved terminal, and spring means acting to support the curved terminal operatively related to the internal transverse shoulder.

12. A wiper blade, a superimposed attaching clip assembly formed with a chamber opening toward the blade and having on its outer face an entranceway to receive the outer arcuate terminal of an actuating arm, said clip assembly including an inwardly projecting arcuate guide face within the chamber for nesting engagement in the arcuate portion of the arm, said arcuate guide face being interrupted by a transverse shoulder, and resilient means arranged within the chamber and normally exerting pressure against the arcuate portion of the arm to urge the same against the arcuate guide face to retain the arm thereagainst, said arm being formed with an upwardly extending lug at its end portion for engaging said shoulder for holding the arm against lengthwise displacement while permitting adjustment of the blade on the guide face to a wiping position on an associated part.

ANTON RAPPL.
ANTHONY C. SCINTA.

REFERENCES CITED

The following references are of record in the file of this patent:

UNITED STATES PATENTS

| Number | Name | Date |
|---|---|---|
| 1,402,657 | Ritz-Waller | Jan. 3, 1922 |
| 1,703,181 | Tarver | Feb. 26, 1929 |
| 2,025,888 | Olivero | Dec. 31, 1935 |
| 2,159,295 | Seifert | May 23, 1939 |
| 2,260,905 | Horton | Oct. 28, 1941 |
| 2,270,589 | Hansen | Jan. 20, 1942 |
| 2,274,277 | Rousseau | Feb. 24, 1942 |
| 2,285,618 | Scinta | June 9, 1942 |
| 2,293,820 | Hansen | Aug. 25, 1942 |
| 2,310,751 | Scinta | Feb. 9, 1943 |